(12) United States Patent
Glaude et al.

(10) Patent No.: US 9,154,319 B2
(45) Date of Patent: *Oct. 6, 2015

(54) METHOD AND APPARATUS FOR SHARING TCAP TRAFFIC LOAD

(71) Applicant: Performance Technologies, Inc., Rochester, NY (US)

(72) Inventors: Normand Glaude, Cumberland (CA); Charles Wesley-James, Ottawa (CA); Christine Aubry, Ottawa (CA); Pierre Laporte, Ottawa (CA)

(73) Assignee: SONUS NETWORKS, INC., Westford, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/202,535

(22) Filed: Mar. 10, 2014

(65) Prior Publication Data

US 2014/0192805 A1 Jul. 10, 2014

Related U.S. Application Data

(60) Division of application No. 13/874,302, filed on Apr. 30, 2013, now Pat. No. 9,036,480, which is a continuation of application No. 12/528,652, filed as application No. PCT/US2007/087636 on Dec. 14, 2007, now Pat. No. 8,452,890.

(60) Provisional application No. 60/891,692, filed on Feb. 26, 2007.

(51) Int. Cl.
*H04L 12/28* (2006.01)
*H04L 12/18* (2006.01)
(Continued)

(52) U.S. Cl.
CPC ............ *H04L 12/1886* (2013.01); *H04L 45/74* (2013.01); *H04L 47/125* (2013.01); *H04Q 3/0025* (2013.01); *H04Q 3/0029* (2013.01); *H04L 49/3009* (2013.01)

(58) Field of Classification Search
None
See application file for complete search history.

(56) References Cited

U.S. PATENT DOCUMENTS 5,701,301 A 12/1997 Weisser, Jr.
5,903,636 A 5/1999 Malik
(Continued)

FOREIGN PATENT DOCUMENTS

EP 1135905 B1 10/2006
EP 1212627 B1 3/2011

OTHER PUBLICATIONS

IPER: PCT International Preliminary Report on Patentability dated Aug. 26, 2009 (4 pages).

*Primary Examiner* — Ian N Moore
*Assistant Examiner* — Phong La
(74) *Attorney, Agent, or Firm* — Straub & Pokotylo; Michael P. Straub; Stephen T. Straub

(57) ABSTRACT

The present invention relates to a point code emulation apparatus and method for dividing a Common Channel Signaling System No. 7 (or SS7) signaling network into two or more networks. The point code emulator is adapted to receive TCAP messages from two or more subnets and converts, for the messages crossing over the subnets, the information of the TCAP messages, including originating point code, destination point code, and transaction identifier, (and optionally, calling party number and called party number), and forwards to the other one of the two or more subnets. Correspondence among the two or more subnets may be provisioned by an authorized user of the system, may be learned automatically by the system based on ISUP message correspondences or previous TCAP transactions, or may be automatically discovered by the system broadcasting messages to nodes in the destined one of the two or more subnets.

18 Claims, 8 Drawing Sheets

(51) Int. Cl.
  *H04Q 3/00*  (2006.01)
  *H04L 12/803*  (2013.01)
  *H04L 12/741*  (2013.01)
  *H04L 12/935*  (2013.01)

(56) References Cited

U.S. PATENT DOCUMENTS

| | | | |
|---|---|---|---|
| 5,905,724 A * | 5/1999 | Carson et al. | 370/385 |
| 5,953,404 A * | 9/1999 | Fikis et al. | 379/230 |
| 6,028,914 A | 2/2000 | Lin et al. | |
| 6,061,432 A * | 5/2000 | Wallace et al. | 379/88.18 |
| 6,078,584 A | 6/2000 | Mottishaw et al. | |
| 6,085,101 A | 7/2000 | Jain et al. | |
| 6,324,183 B1 * | 11/2001 | Miller et al. | 370/467 |
| 6,327,350 B1 * | 12/2001 | Spangler et al. | 379/115.01 |
| 6,501,950 B1 | 12/2002 | Smith et al. | |
| 6,529,524 B1 * | 3/2003 | Liao et al. | 370/467 |
| 6,668,049 B1 | 12/2003 | Koch et al. | |
| 6,781,954 B1 | 8/2004 | Aalto et al. | |
| 6,876,632 B1 | 4/2005 | Takeda | |
| 6,940,866 B1 * | 9/2005 | Miller et al. | 370/426 |
| 6,978,313 B1 | 12/2005 | Pietrowicz | |
| 6,987,781 B1 | 1/2006 | Miller et al. | |
| 6,993,119 B1 | 1/2006 | Zhang et al. | |
| 7,010,113 B2 | 3/2006 | Moss et al. | |
| 7,023,837 B1 | 4/2006 | Srinivasan | |
| 7,035,385 B2 | 4/2006 | Levine et al. | |
| 7,054,939 B2 | 5/2006 | Koch et al. | |
| 7,184,538 B1 | 2/2007 | Doskow et al. | |
| 7,224,686 B1 | 5/2007 | Doskow et al. | |
| 7,274,783 B2 | 9/2007 | Yoakum et al. | |
| 7,286,659 B2 | 10/2007 | Crockett et al. | |
| 7,502,622 B1 | 3/2009 | Lekutai | |
| 7,702,091 B1 | 4/2010 | Goodman et al. | |
| 7,844,033 B2 * | 11/2010 | Drum et al. | 379/32.05 |
| 8,204,200 B2 | 6/2012 | Wang et al. | |
| 8,295,865 B1 | 10/2012 | Kirchhoff et al. | |
| 2002/0118813 A1 * | 8/2002 | Brehm et al. | 379/229 |
| 2003/0161301 A1 * | 8/2003 | Sprague et al. | 370/352 |
| 2003/0214971 A1 | 11/2003 | Sheldon et al. | |
| 2003/0231654 A1 * | 12/2003 | Gilchrist et al. | 370/467 |
| 2004/0240658 A1 | 12/2004 | Delaney et al. | 379/229 |
| 2005/0203994 A1 * | 9/2005 | Palmer et al. | 709/203 |
| 2005/0238036 A1 | 10/2005 | Miller et al. | |
| 2006/0227784 A1 * | 10/2006 | Delaney et al. | 370/392 |
| 2006/0274661 A1 * | 12/2006 | Drum et al. | 370/241 |
| 2007/0008955 A1 * | 1/2007 | Delaney et al. | 370/352 |

* cited by examiner

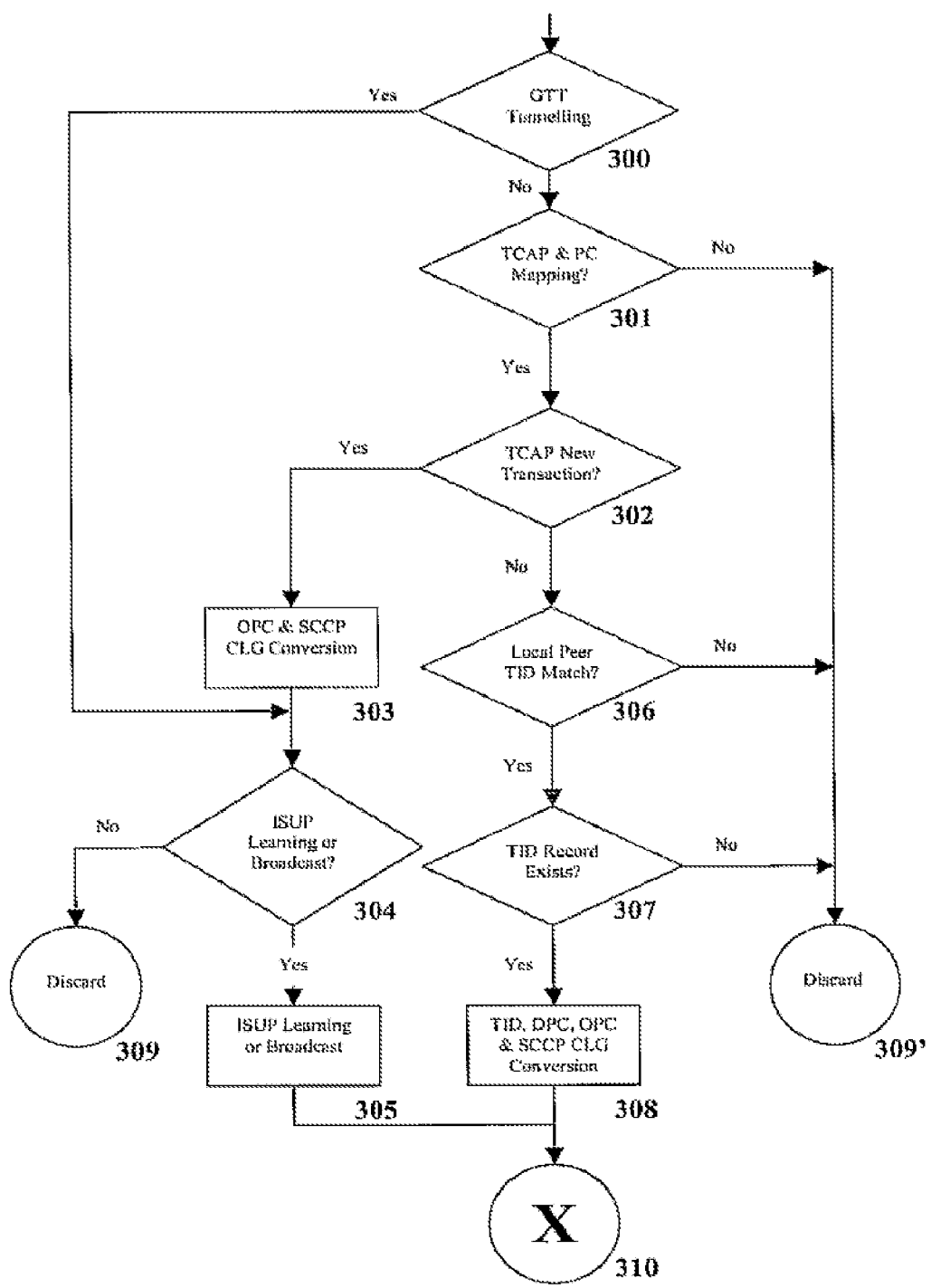

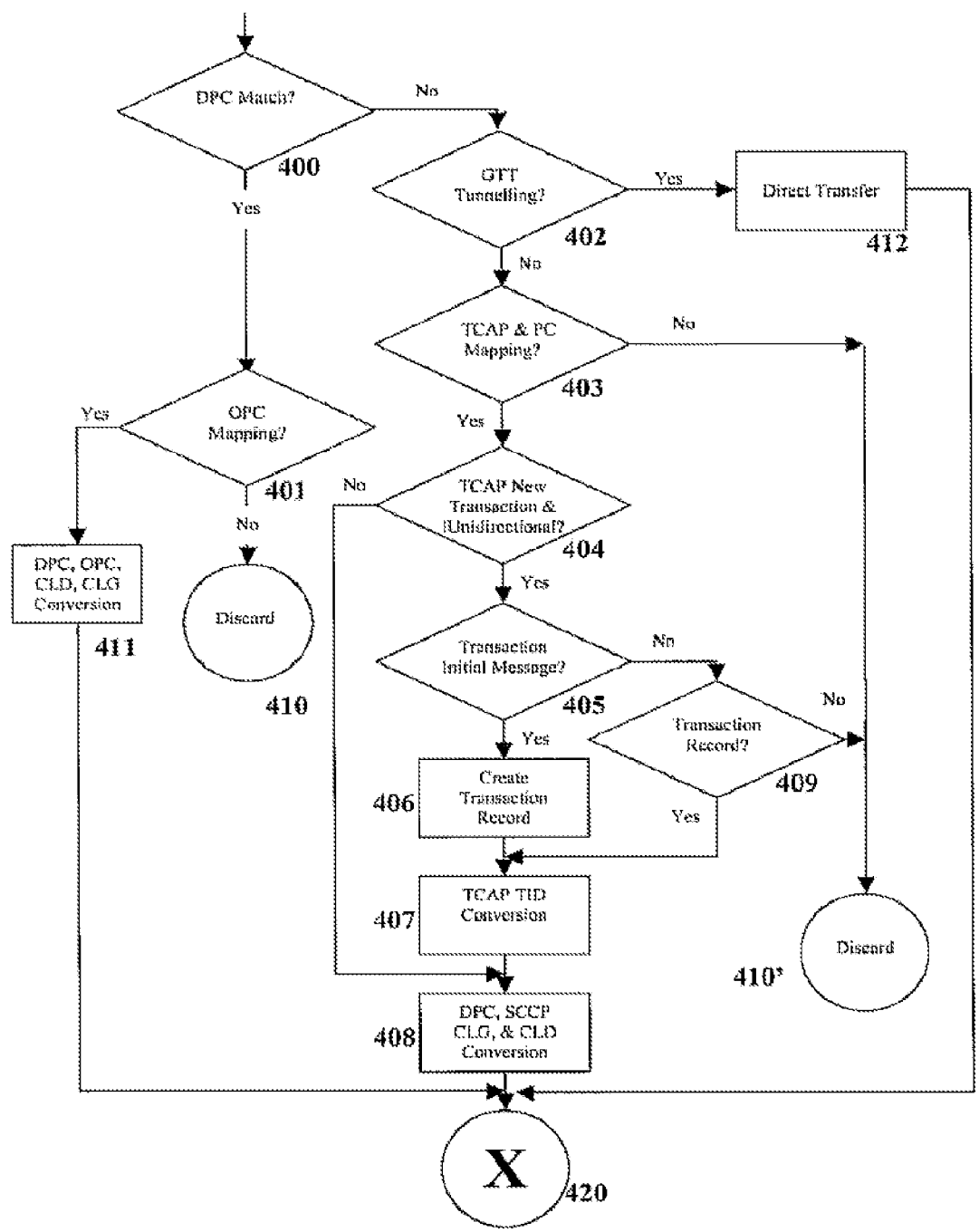

METHOD AND APPARATUS FOR SHARING TCAP TRAFFIC LOAD

CROSS-REFERENCE TO RELATED APPLICATIONS

This application is a divisional of application Ser. No. 13/874,302, filed on Apr. 30, 2013, which is a continuation of application Ser. No. 12/528,652 filed Aug. 26, 2009, now U.S. Pat. No. 8,452,890, which was the National Stage of International Application No. PCT/US2007/087636 filed Dec. 14, 2007, which claims the benefit of U.S. Provisional Application No. 60/891,692 filed Feb. 26, 2007.

FIELD OF THE INVENTION

The present invention relates to a point code emulation apparatus, system and method for dividing a Common Channel Signaling System No. 7 (or SS7) signaling network into two or more networks.

BACKGROUND OF THE INVENTION

Common Channel Signaling System No. 7 (or SS7) is a global standard for telecommunications defined by the International Telecommunication Union Telecommunication Standardization Sector (or ITU-T). The standard defines the procedures and protocol by which network elements in the public switched telephone network (PSTN) exchange information over a digital signaling network to effect wireless (cellular) and wireline call setup, routing and control. The ITU definition of SS7 allows for national variants such as the American National Standards Institute (ANSI) and Bell Communications Research (Telcordia Technologies) standards used in North America, the European Telecommunication Standards Institute (ETSI) standard used in Europe, and the Telecommunication Technology Committee (TTC) standard used in Japan. SS7 messages are exchanged between network elements over 56 or 64 kilobit per second (kbps) bi-directional channels called signaling links, or can be exchanged over the Internet Protocol or over ATM in a point-to-point or networking fashion using adaptation layers. As SS7 network evolves, more transparent methods and protocols can be defined.

Each signaling point in the SS7 network is uniquely identified by a numeric point code. Point codes are carried in signaling messages exchanged between signaling points to identify the source and destination of each message. However, as the network grows its size and complexity, new point codes would eventually become scarce and, thus creating such new point codes would be very expensive. Re-architecturing a signaling network, i.e. adding a new network (or network elements) or deleting a part of the network could also be time consuming and often requires reprogramming the switches according to the new network architecture, thus it is desirable to have a method and apparatus for expanding the network without going through such network rearchitecturing.

There are a couple of prior art systems attempted to solve such issues. For example, U.S. Pat. No. 6,987,781, entitled "Methods and Systems for Routing signaling Messages in a Communication Network Using Circuit Identification Code (CIC) Information", issued to Miller et al on Jun. 17, 2006 relates to a routing node for receiving, processing and subsequently transmitting SS7 signaling messages destined for a Media Gateway Controller type network element, where the network element is a CIC routing node adapted to receive ISUP messages from an associated SS7 network and determine the routing destination of the messages based on originating point code (or OPC), destination point code (or DPC) and circuit identification code (or CIC). However, in this prior system, such conversion is limited to ISUP messages, thus it would not be able to extend the services using other message types, such as SCCP or TCAP messages, thus this is a limitation of this solution.

SUMMARY OF THE INVENTION

The present invention relates to a point code emulation apparatus, system and method for dividing a Common Channel Signaling System No. 7 (or SS7) signaling network into two or more networks.

One object of the present invention is to overcome the limitation on the number of addressable nodes in a network, and, to provide a method and apparatus for expanding and extending the network without having to re-architecting the entire SS7 signaling network.

Another object of the present invention is to divide the SS7 signaling network into two or more subnets.

Yet another object of the present invention is to provide a system for sharing TCAP traffic load among a plurality of nodes in a subnet by hiding details of the subnet.

According to one aspect of the invention, it provides a method of routing a TCAP message for dividing a SS7 signaling network into two or more subnets, comprising the steps of: (i) receiving the TCAP message from one of the two or more subnets; (ii) extracting OPC, DPC and TID of the TCAP message; (iii) looking up and retrieving, from a plurality of structured data storages, a corresponding OPC, a corresponding DPC and a corresponding TID for the other one of the two or more subnets based, partially or combinedly, on the OPC, the DPC and the TID of the received TCAP message; (iv) replacing the OPC, the DPC, and/or the TID of the received TCAP message with the corresponding OPC, the corresponding DPC and/or the corresponding TID; and (v) forwarding the TCAP message with the corresponding OPC, the corresponding DPC and the corresponding TID to the other one of the two or more subnets.

According to another aspect of the invention, it provides a computer readable medium storing executable computer program instructions which, when executed at a node, cause the node to perform a process of routing a TCAP message between two or more subnets of a SS7 signaling network, comprising steps of: (i) receiving said TCAP message from one of the two or more subnets; (ii) extracting OPC, DPC and TID of the TCAP message; (iii) looking up and retrieving, from a plurality of structured data storages, a corresponding OPC, a corresponding DPC and a corresponding TID for the other one of the two or more subnets based, partially or combinedly, on the OPC, the DPC and the TID of the received TCAP message; (iv) replacing the OPC, the DPC, and/or the TID of the received TCAP message with the corresponding OPC, the corresponding DPC and/or the corresponding TID; and (v) forwarding the TCAP message with the corresponding OPC, the corresponding DPC and the corresponding TID to the other one of the two or more subnets.

According to yet another aspect of the invention, it provides a network apparatus for routing a TCAP message between at least two subnets of a SS7 signaling network, comprising: (i) a corresponding number of interfaces to said at least two subnets of said SS7 signaling network for interfacing with said at least two subnets; (ii) a plurality of structured data storages; and (iii) a processor in communication with the corresponding number of the interfaces and the plurality of data storage, wherein the processor is for carrying out a process of said routing said TCAP message between said at least two subnets, said process comprising the process of:—receiving said TCAP message from one of the two or more subnets;—extracting OPC, DPC and TID of the TCAP message;—looking up and retrieving, from the plurality of structured data storages, a corresponding OPC, a corresponding DPC and a corresponding TID for the other one of said two or more subnets based, partially or combinedly, on the OPC, the DPC and the TID of the received TCAP message; replacing the OPC, the DPC, and/or the TID of the received TCAP message with the corresponding OPC, the corresponding DPC and/or the corresponding TID; and—forwarding the TCAP message with the corresponding OPC, the corresponding DPC and the corresponding TID to the other one of the two or more subnets.

BRIEF DESCRIPTION OF THE DRAWINGS

The invention will now be described in more detail with reference to the accompanying drawings, in which:

FIG. 7 is a process flow chart for handling a TCAP message originated from a node in Public Network; and FIG. 8 is a process flow chart for handling a TCAP message originated from a node in Private Network.

DETAILED DESCRIPTION OF THE INVENTION

Figure 1:
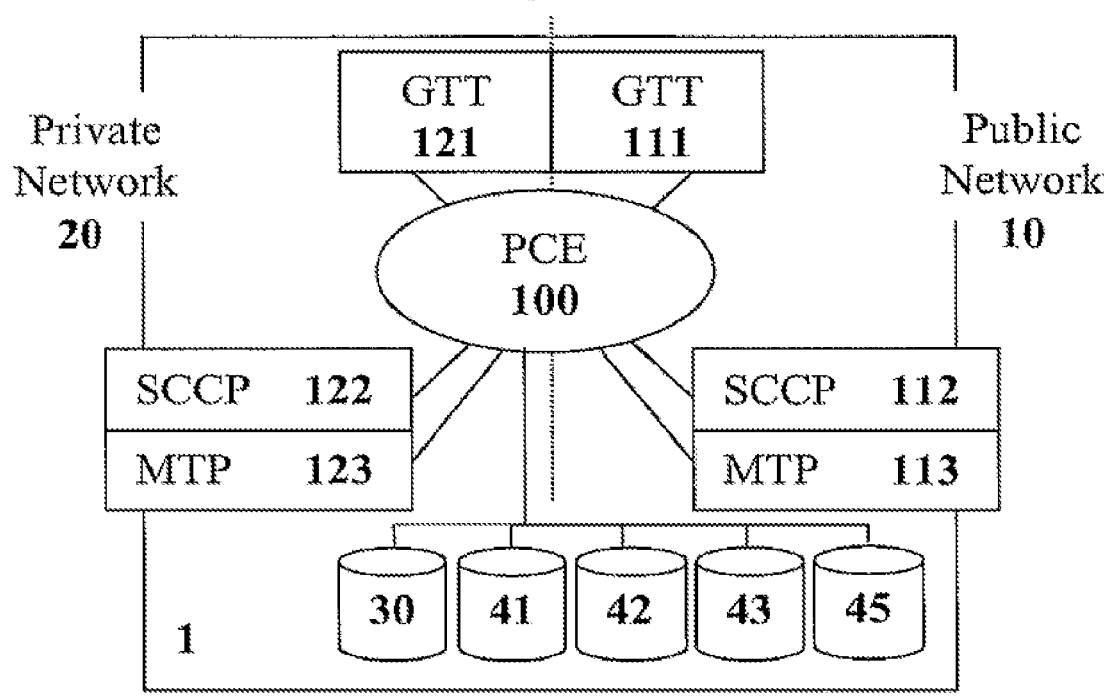
FIG. 1 is an overview of a point code emulation of a preferred embodiment of the present invention.

Referring to FIG. 1, a system 1 is a signal transfer point (STP) in a SS7 signalling network. The system 1 comprises a point code emulator 100 interacting with SCCP 112 and MTP 113 in Public Network 10 side and with SCCP 122 and MTP 123 in Subnet (or Private Network) 20 side. The system 1 further comprises GTT 111 at Public Network 10 side and GTT 121 at Private Network 20 side. The system 1 may interface with more than two network segments or subnets. For each subnet, the system 1 would further comprises corresponding SCCP (not shown) and MTP (not shown), and corresponding GTT (not shown), in communication with PCE 100.

The system 1 further comprises at least one structured data storage means 30, such as database, embedded within, externally accessible from PCE 100, or internally accessible within the system 1 for recording, managing and querying point codes and trunk mappings for each subnet the system 1 is connected to, the data including, but not limited to, Public Nodes (or Nodes in Public Network 10), Private Nodes (or Nodes in Private Network 20), Public gateway, GTT tunnel Gateways, trunk mappings and ISUP Learning Exceptions.

The Public Nodes define the switches in Public Network 10 while the Private Nodes define the switches in Private Network 20. The Public Gateway represents the point code presence in Public Network 10 to access Private Network 20. The GTT Tunnel Gateway represents the GTT Tunnel point codes in both Public Network 10 and Private Network 20 for the TCAP management bypass. The Trunk Mapping is used for ISUP traffic only by defining CIC range maps.

A Public Node record is created for every switch in Public Network 10, which requires access to Private Network 20. The Public Node records are stored/managed in the database. It is noted that the Public Nodes are not limited to switches/nodes adjacent to the system 1 in Public Network 10. For TCAP traffic, the number of Public Nodes can be in the hundreds due to Private Network 20 initiated transaction with Point Code-Sub System Number (or PC-SSN) routing. It is preferable that two hash tables may be utilized for efficient querying, i.e. one for the messages via Public Home Point Code and the other with Point Code for Private Network 20.

A Private Node record is created for every switch in Private Network 20. For TCAP only traffic, Private Node records may not be required due to GTT Routing and Transaction Id (or TID) records which keep track of the originating Point Code of the switch/node in Private Network 20.

PCE 100 typically supports a single Point Code presence in Public Network 10 via a Public Gateway record for interacting with nodes in Private network 20. A second Public Gateway record can be created if there are multiple Point Code presences available in Public Network 10. Multiple Public Gateway deployment is used when two existing correlated switches are extracted from a network to form the expanding Private network 20. The resulting Public Network 10 is already configured for the two Point Code presences.

MTP 113 and MTP 123 handle inter-network traffic and intercept cross network traffic. Virtual Nodes are defined in the MTP 123 for corresponding a point code in Private Network 20 to relevant nodes in Public Network 10. Virtual Nodes are also defined in MTP 113 for corresponding Gateway Point Codes in Public Network 10 and for any corresponding GTT tunnel Gateway Point Code(s).

SCCP 112 routes all TCAP traffic to PCE 100, which is same for Private Network 20, SCCP 122 routes all TCAP traffic to PCE 100 for GTT 111 and Point Code-SubSystem Number (PC-SSN) routed traffic. SCCP Management messages (SCMG) are preferably processed locally within the associated network side in which the messages are originated from, and thus are not crossing over to the other side of the network.

The GTT 111 is used to route the TCAP transactions initiated by Public Network 10 to Private Network 20 and the TCAP messages destined for PCE GTT Tunnelling (not shown).

The GTT Tunnelling is to bypass the TCAP transaction conversion for certain SCCP services. For example, GSM traffic and LNP ANSI queries might originate from Private Network 20. As the GSM traffic is routed on GTT information but LNP is PC-SSN routed, the LNP queries would require TCAP transaction management while the GSM message would be sent to the GTT directly via GTT Tunnelling.

The GTT Tunnelling can be identified by the incoming message's Destination Point Code (DPC). Cross network configuration between the Private and Public tunnelling messages is required for proper routing at PCE 100 to the appropriate SCCP.

For GTT routing of Public initiated queries, the GTT Destination List is set to the necessary Private Network Appearance with its relevant point codes. This allows cross network transfer at the GTT 111. PCE 100 will forward the resulting message directly to SCCP 122 in Private Network 20 side.

In the other embodiment of the present invention, the system 1 further permits multiple Private Network Appearances to configure two switches in Private Network 20 with the same point code.

TCAP transaction identifiers are up to 4 octets in length and are unique from an origination switch to a given destination. Thus the combination of OPC, DPC, and TID make a unique key.

As Nodes in Private Network 20 are usually not a one-to-one mapping to the Public Gateways, each of the TIDs in TCAP messages originated from Private Network 20 must be mapped to a unique value to ensure their uniqueness in Public Network 10. For Public Nodes, the TID mapping is also useful to keep track of the Public Gateway used to receive the public query such that the response uses the proper OPC back to Public Network 10. It is noted that, in the case of a mated-pair configuration for redundant SS7 traffic support, each PCE 100 must not duplicate the TIDs used to maintain their uniqueness.

The TID information may be stored and managed in a structured data storage means, i.e. hash tables, to allow for efficient queries based on TIDs of the incoming TCAP messages. Preferably, PCE 100 comprises at least two hash tables, one based on incoming original TID 41 and the other based on received TID 42. The original TID search is used during conversation to find an existing record. The received TID is used to correlate bi-directional messages between TID records for Public Network 10 and TID records for Private Network 20 during transaction completion from one of Public Network 10 and Private Network 20, whichever did not initiate the original TCAP query. The received TID search is used during responses to find the original information.

When PCE 100 records the TIDs, each of the records is given an expiry time and a lifespan for the record, and such lifespan information may be managed using another structured data storage means, i.e. a list (or a lifespan list) 43 and managed using timer related software object. As lifespan value is individually assigned and managed for each of the records and can be cleared in a first-in first-out fashion. PCE 100 maintains the lifespan list 43 and, at every specific time interval, the first item (or the oldest item) in the lifespan list 43 is evaluated to determine whether the lifespan is expired. Upon expiry of the lifespan of the oldest item, the lifespan list 43 is parsed from the head (or oldest one) toward the tail (or the youngest one). Each lifespan, which is considered to be expired, is recycled and causes corresponding TID records in the incoming original TID hash table 41 and/or the received TID hash table 42 to be recycled as well, and the timer is restarted if necessary.

Figure 2:
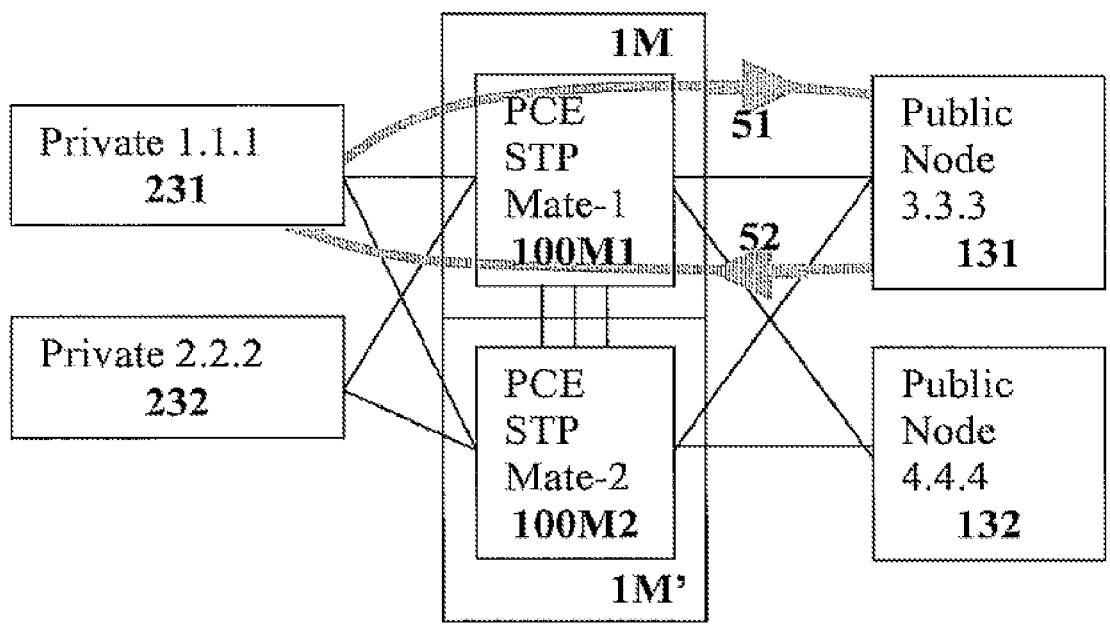
FIG. 2 is a simplified network diagram showing TCAP message flow from a node in Private Network.

FIG. 2 illustrates a typical TCAP message flow originating from a Private Node 231 to a Public Node 131 though PCE STP Mate 1 100M1 of the system 1M, which is in a mated-pair configuration with the system 1M'. A TCAP-Begin message is originated from Private Node 231 (PC value is 1.1.1), bearing OPC value of 1.1.1, DPC value of 3.3.3 and TID value of 000001 in the direction 51. PCE 100 intercepts the TCAP-Begin message and stores TID and OPC in the hash table. PCE 100, then, replaces OPC value with 5.5.5, which is the PC of the system 1 for Public Network 10, and replaces TID value with an available unique TID value, i.e. 100001, in this example. PCE 100 forwards the message to Public Node 131. Once Public Node 131 receives the message, then Public Node 131 generates a TCAP-Response message, bearing OPC value of 3.3.3, DPC value of 5.5.5, and TID value of 100001, and forwards the message in the direction 52. PCE 100 intercepts the TCAP-Response message and look up DPC and TID in the hash table, and finds that Private Node 231 and TID value of 000001 corresponds, thus replaces DPC and TID, accordingly. Then, PCE 100 forwards the message to the Private Node 231.

Figure 3:
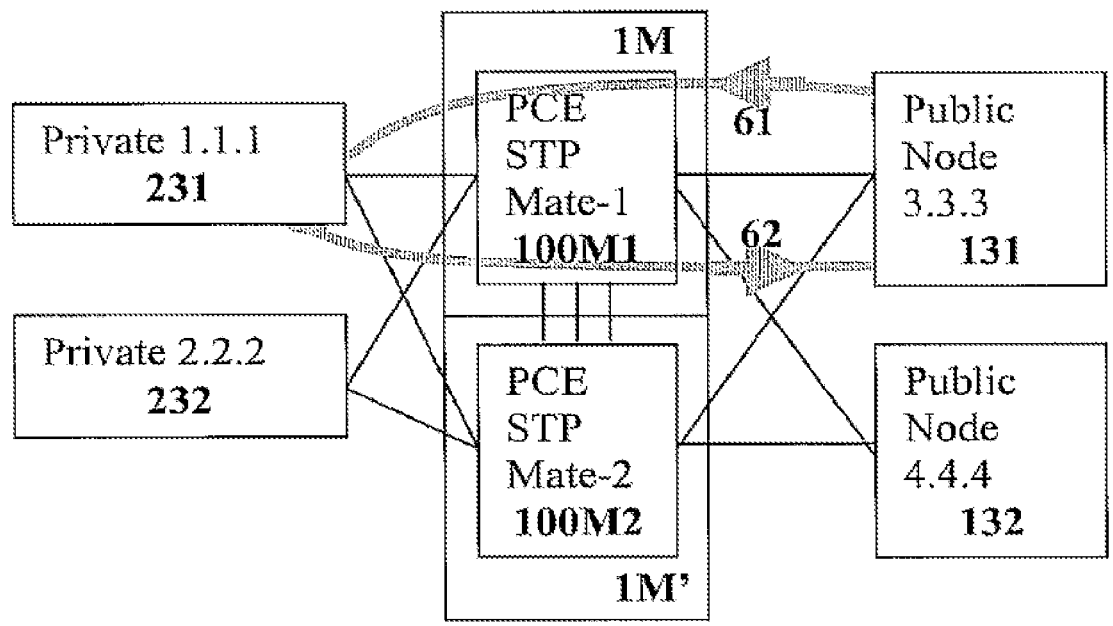
FIG. 3 is a simplified network diagram showing TCAP message flow from a node in Public Network.

FIG. 3 illustrates a typical TCAP message flow originating from a Public Node having point code value 3.3.3 131 to a Private Node having point code value 1.1.1 231 through PCE STP Mate 1 100M1. For such case, the operator of Private Network 20 provisions PCE 100 to either route all TCAP traffic designated to specific Public Gateway to a single node in Private Network 20, or retrieve a final destination from GTT 111 and/or GTT 121.

The Point Codes that are used to represent nodes in Private Network 20 to Public Network 10 are known as Public Gateway Point Codes. The operator of Private Network 20 may choose to declare one private destination for a particular Public gateway point code. This would be appropriate if there is a Public Gateway Point Code(s) that are to represent one application node in Private Network 20. This may be an uncommon usage of PCE 100, as one public destination is required to be fixed to one private destination.

A TCAP Begin message is sent from Public Node 3.3.3 131 to PCE STP Mate-1 100M1 in the direction 61, where the message bearing OPC value of 3.3.3, DPC value of 5.5.5 (which is the system 1's PC value in Public Network 10), and TID value of 000001. Assuming that the operator of Private Network 20 or the authorized user of PCE 100 has been provisioned PCE 100 such that all TCAP Begin message sent to the system 1 or Public Gateway Node at 5.5.5 should be directed to the private node 1.1.1. In a case where the operator of Private Network 20 may have rather provisioned GTT 111 or/and 121 databases, thus for TCAP transactions that originate (with a TCAP Begin message) from Public Network 10, PCE 100 may interact with GTT to seek for a final destination in Private Network 20.

PCE 100 replaces the DPC value to 1.1.1 as provisioned and assign new value for TID, i.e. 100001, record TIDs in the TID hash tables, and forward the converted message to Private Node 1.1.1 231 in Private Network 20. Once Private Node 1.1.1 231 receives the TCAP Begin message, it generates the TCAP Response message bearing OPC value of 1.1.1, DPC value of 3.3.3, and TID value of 100001, and forwards the message in the direction 62. PCE 100, again, intercepts the message and look up corresponding TID for Public Network 10 from the hash tables 41 and 42, and retrieves the corresponding TID value, which is 000001. PCE 100 converts OPC value to 5.5.5 and TID values to 000001, and forwards the converted message to Public Node 3.3.3 131.

Occasionally, when the operator of Private Network 20 provisioned PCE 100 to inquire GTT for resolving final destination for TCAP messages originated from a node in Public Network 10, the result of the inquiry to GTT 121 and/or GTT 111 may be inconclusive. If the GTT information is inconclusive and traffic cannot be mapped one-to-one between the system 1 (or the Public Gateway) and a node in Private Network 20, PCE 100 may broadcast the message to all or designated nodes in Private Network 20. Once PCE 100 broadcasts the TCAP query to all or designated nodes in Private Network 20, PCE 100 waits for a successful response before forwarding the response back to the Public Node 131. PCE may, optionally, send the TCAP query to a randomly selected node(s) in Private Network 20. Upon reception of successful responses from the nodes in Private Network 20, the most successful one will be regarded as the designation in Private Network 20 for the transaction.

If a broadcast has returned a successful response to one TCAP message, then it stands to reason that there is a TCAP request to the same called party afterwards. This would avoid broadcasting repeatedly to the switches including the switch that just provided a positive response. Similarly, if a message comes from Private Network 20 with calling party information, this information can be used to further learn about destinations in Private Network 20.

Figure 4:
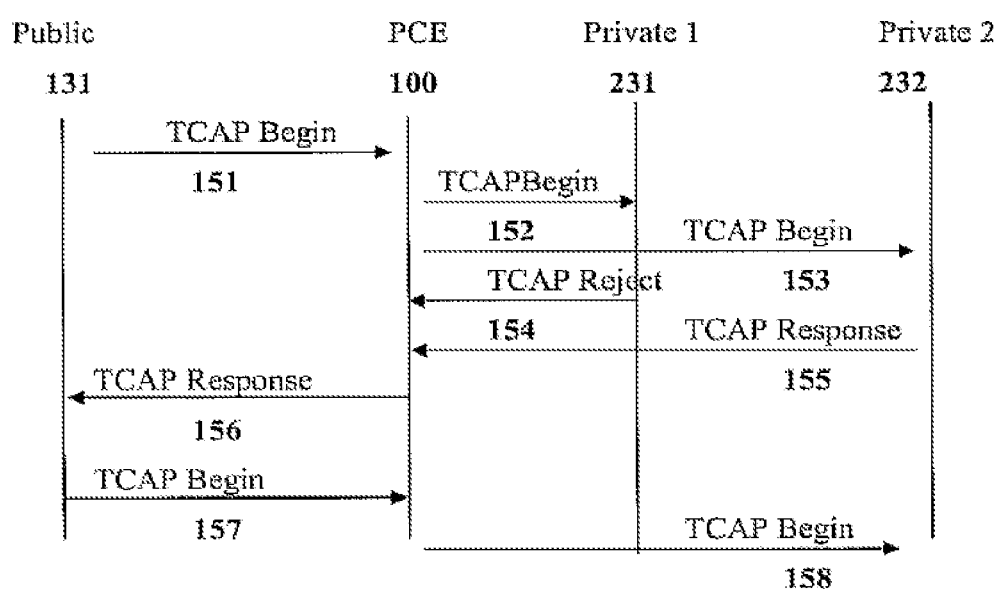
FIG. 4 is a call flow diagram showing a case for TCAP broadcasting.

FIG. 4 is a call flow chart illustrating TCAP broadcast learning method. Public Node 131 generates and transmits TCAP begin message 151 to PCE 100. The PCE 100, then, broadcasts the messages 152 and 153 to all Private Nodes 231 and 232, respectfully, since PCE 100 could not determine to which node in Private Network 20 the message should be routed. Private Node 231 rejects, generates and transmits TCAP Reject message 154 back to PCE 100. Private Node 232 accepts, generates and transmits TCAP Response 155 to PCE 100. PCE 100 learns from this transaction that the private node (or called party) that was able to successfully terminate the TCAP Begin message from Public Node 131 was Private Node 232. Subsequently, when PCE 100 receives another TCAP Begin message 157 from the same called party number, PCE 100 simply forwards the message 158 to Private Node 232.

Figure 5:
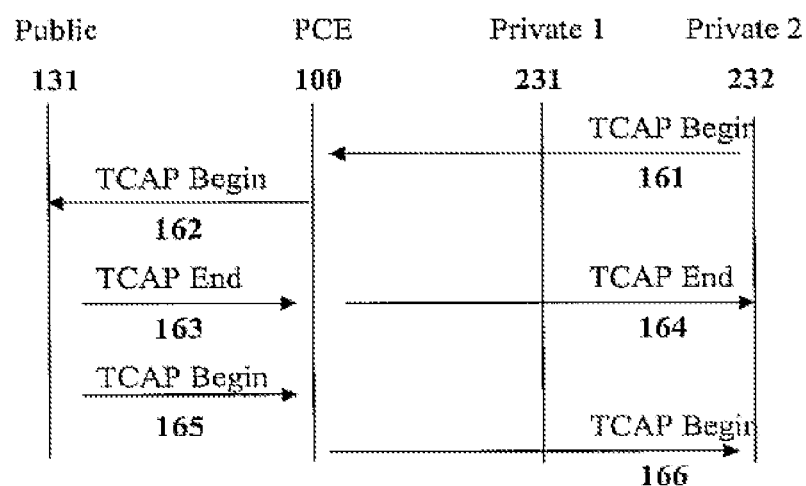
FIG. 5 is a call flow diagram showing a case for TCAP learning from previous TCAP message.

FIG. 5 is a call flow chart illustrating learning method from TCAP message initiated from Private Network 20. Private Node 232 sends a TCAP Begin message 161 to PCE 100. PCE 100 converts and forwards TCAP Begin message 162 to Public Node 131, and make records of calling party digits and TID information in the hash tables 41 and 42. Once Public Node 131 receives TCAP Begin message 162, Public Node 131 generates and transmits TCAP End message 163 to PCE 100. PCE 100 looks up and retrieve TID from the hash table 41 and 42, converts and transmits the message 164 to Private Node 232. Subsequently, Public Node 131 transmits a TCAP Begin message 165 to PCE 100. Based on the called party digits and the originator information, PCE 100 looks up and retrieve corresponding DPC and TID value from the hash tables 41 and 42. PCE 100, then, converts and forwards the message 166 to Private Node 232.

ISUP traffic between the Public and a Private network is well defined by the Trunk Mappings. For TCAP traffic, the TID mapping is unique for Private queries to Public Network 10 but not in the reverse direction. Typically, the GTT is configured to select the proper Private Node or a broadcast scheme can be used as described above. ISUP learning may be enabled or disabled by an authorized user.

For "class 5" functionality such as "*69" using TCAP queries, the preceding ISUP IAM contains the digits information used in the TCAP SCCP Called Party Address parameter. As the IAM already knows its destination based on its CIC, the Private Node can be learned for a given phone number.

The ISUP learned information should not be kept statically as phone numbers can be ported and cell phones can roam. The ISUP learning digits have a configurable lifespan set, preferably, in seconds. In the preferred embodiment of the present invention, the lifespan is 1 day (86400 seconds).

ISUP learning is based on the IAM digits parameter(s) of interest. For local number portability and other services which might affect the dialled digits, the ISUP Learning can be configured to process IAM Called Party Number and/or Original Called Number for Public initiated traffic and/or IAM Calling Party Number for Private initiated traffic.

The ISUP Learning information has two types of distribution: broadcast, and query-and-response. For each types of distribution, the user may set the ISUP Learning Max Delay parameter. In the preferred embodiment of the present invention, ISUP Learning Max Delay parameter may be set to 0 for broadcast, and to a millisecond interval (1000 recommended) for Public TCAP query ISUP Learning query to all peers with pending response. The ISUP learning is digit based and is stored in a structured data storage means 45, i.e. a number tree for quick access.

On receipt of learning digits, the number tree 45 is queried to see if the corresponding private node is already there in the record. If the ISUP Learning record is not found, a new record is created. If the record is found, the private node name is updated if necessary and the lifespan is reset.

Optionally, in order to maintain the number tree compact, if the ISUP Learning records count exceeds a certain number, i.e. 100,000, PCE 100 forces the expiry of the oldest 100 (or so) records from the lifespan list.

It is also true that not all IAM digits are of interest. In the case of 800 numbers, the destination may change switches based on date and time. Thus the information cannot be kept in the ISUP Learning tree. The ISUP Learning Exception configurable objects can be used to define which prefix digits are not to be learned. If the IAM's digits match any of the exception prefixes, the digits are not learned.

In the case of mated-pair configuration, the ISUP learning information is gathered at the PCE 100 peers receiving the ISUP IAM messages. As most TCAP services are sent via connectionless messages such as UDTs, the Public TCAP query associated with a given digits may not be received at the same PCE 100 peer, which received the IAM. Thus, the ISUP learning information must be available to all PCE peers for proper management.

The user can change the distribute implementation during run time, typically from Broadcast to Query-and-Response (ISUP Learning Max Delay>0). During the transition between the two implementations, the peers will simply return multiple successful responses until their record lifespan expired.

On the rare event that a Query-and-Response is modified to a Broadcast implementation, the Public TCAP query will not find the digits for old ISUP Learning records unless they are received on the proper peer. Any new records will be properly processed, which should allow most "class 5" features which send their IAM prior to their corresponding TCAP. The ISUP Learning information will be reset once the old records expire for at most ISUP Learning Lifespan seconds.

The ISUP Learning records are created or updated based on a received IAM. The new or updated record is then broadcast to all PCE peers for distribution management. Even if the record is already present, the updated record is broadcast to update the Private Node name if necessary and to reset the record lifespan at each PCE peer. On receipt of a Public TCAP message, the local ISUP Learning number tree is queried to see if the digits are learned.

For race conditions, the broadcast record should arrive at the PCE 100 peer prior to the Public TCAP query as the query if often sent following IAM processing such as once the call is closed due to a busy signal. The IAM processing at the remote end should ensure enough time for the ISUP Learning record to be distributed. If the TCAP is received prior to the broadcast, the query will be simply treated as unlearned digits.

Figure 6:
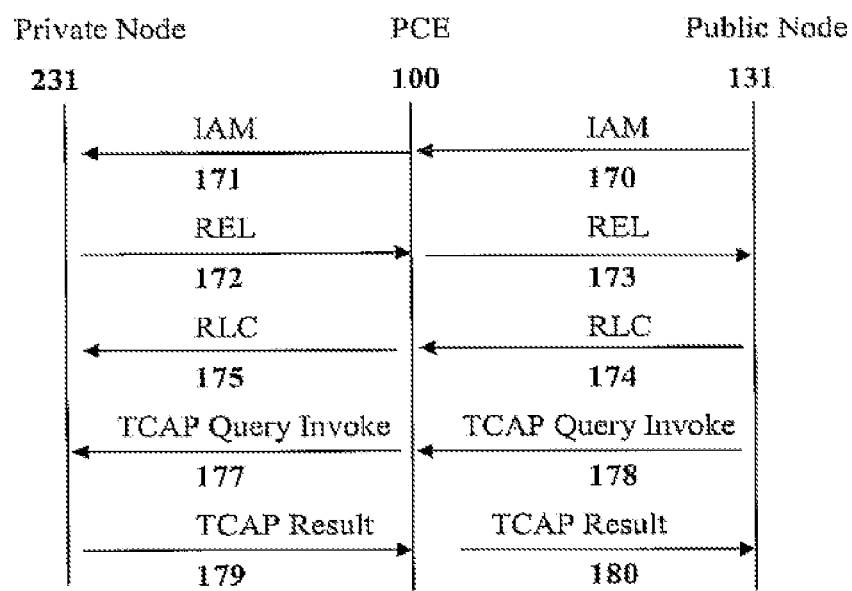
FIG. 6 is a call flow diagram showing a case for ISUP learning.

FIG. 6 is a call flow diagram illustrating ISUP learning feature of the present invention. Assuming that a subscriber on Public Node 131 place a call, causing Public Node 131 to generate and transmit IAM message 170. Through PCE 100, IAM message 171 is routed (while PCE 100 processes the necessary steps and manipulations to route the message properly) to Private Node 231. Assume that there is no resource available to accept this call, thus Private Node 231 generates and transmit REL message 172 back, through PCE 100, and the message 173 is reached to Public Node 131. Then, the subscriber subsequently dial "*66", which causes Public Node 131 to generate and transmit TCAP Query Invoke message 178 bounded to PCE 100. Since PCE 100 has already handled and examined IAM message 170 previously, thus PCE 100 determines to route TCAP Query Invoke message 178 to Private Node 231 based on called party digits. PCE 100 processes the message (and records TIDs in the hash tables 41 and 42) and transmit the message 177 to Private Node 231. Once Private Node 231 receives the message 177, and after processes the query, Private Node 231 generates and transmits TCAP Result message 179. PCE 100 intercepts the message, looks up and retrieve from the hash tables 41 and 42 the corresponding TID. PCE 100, then, converts TID and OPC, and forwards the message 180 to Public Node 131.

IAM digit learning may be managed locally at the system 1. On receipt of a Public TCAP query requiring ISUP Learning, a query is sent out to all peers (regardless if the local peer has a known record) while keeping a copy of the SCCP encoded message. The peers respond with an error or a success with the private node name and expiry time. When all the responses are received or the Max Delay timer expires, the most recent entry is used. If there is no entry, the ISUP Learning fails and processing for the Public TCAP query continues with the Broadcast to Private option.

It is to be noted that each node in Private Network 20 is able to maintain its own El 64 number; however, the operator of Private Network 20 wishes to hide such information from Public Network 10, since exposing private El 64 number implies that a new network entry in Public Network 10. For example, on outbound messages from Private Network 20 to Public Network 10, the private El 64 would have to be displayed to the outside world as a public El 64 number. On Inbound messages to Private Network 20, the appropriate El 64 number shall be mapped to the messages. For solving such problem, Private Node record and Public Gateway record have a field for storing El 64 numbers, thus PCE 100 is able to translate and route the messages to the appropriate node.

FIG. 7 illustrates a general process flow of PCE 100 handling a TCAP message originated from Public Network 10. Once PCE 100 intercepts the TCAP message originated from Public Network 10, PCE 100 checks in the database 30, based on DPC of the message, whether GTT tunneling is provisioned at step 300. If so, PCE 100 skips the steps and proceeds to step 304; otherwise, PCE 100 proceeds to the step 301. Then, PCE 100 further checks whether the provisional parameters for TCAP and Point Code mapping have been enabled at step 301; or else, the message is discarded at step 309'. The authorized user of PCE 100 may provision these parameters. If so, then, PCE 100 looks up the database 30 to confirm whether it is for a New TCAP transaction at step 302. If so, OPC and Calling Party (CLG) information are converted at step 303, then, PCE 100 further checks whether TID can be found via ISUP Learning or Broadcast is required to discover the corresponding information at step 304. If so, PCE 100 retrieves information that are leaned through ISUP Learning or initiate broadcasting to Private Network 20 to discover the proper corresponding information at step 305; otherwise, the message is discarded at step 309. Returning to step 302, if the TCAP message was not for new transaction, then PCE 100 checks, if it is in a mated-peer configuration, whether TID may be found from the Peer PCE (not shown) at step 306; otherwise, the message is discarded at step 309'. If so, PCE 100 further looks up TID records in the database 30 or the hash tables 41 and 42 to see if TID record exists at step 307. If TID is found, TID, DPC, OPC and CLG are converted and forward the message at step 308. Otherwise, the TCAP message will be discarded at step 309'.

FIG. 8 illustrates a general process flow of PCE 100 handling a TCAP message originated from Private network 20. Once PCE 100 receives a TCAP message originated from Private Network 20, PCE 100 looks up the structured data storages 30, 41 and 42 to see if DPC match exists at step 400. If so, PCE 100 further checks whether OPC mapping is being provisioned by the authorized user. If so, PCE 100 converts DPC, OPC, Called Party Number (CLD) and CLG at step 411; otherwise, the message is discarded at step 410. Going back to step 400, if DPC match was not found, PCE 100 further checks in the database 30 GTT tunneling was provisioned based on DPC of the message at step 402. If so, PCE 100 skips all the steps and proceeds to step 412 for direct transfer of the message to Public Network 10; otherwise, PCE 100 proceeds and checks whether the authorized user has provisioned TCAP & Point Code mapping feature at step 403. If so, PCE 100 checks whether the message is for a new TCAP transaction and it is not unidirectional at step 404. If that is false, PCE 100 skips and go directly to step 407, which will be discussed in following; however, if it is true, then PCE 100 further examines whether the message is for transaction initial message at step 405. If so, PCE 100 creates a transaction record at step 406; otherwise, PCE 100 look up and see whether there is any transaction record at step 409. If not true, then the message is discarded; otherwise, PCE 100 skips the step 406 and proceeds to step 407. Once the transaction record is created or retrieved, PCE 100 converts TID of TCAP message at step 407. Then, at step 408, PCE 100 further converts DPC, CLG and CLD at step 408.

It is to be understood that the embodiments and variations shown and described herein are merely illustrations of the principles of this invention and that various modifications may be implemented by those skilled in the art without departing from the spirit and scope of the invention. It is also to be understood that present invention may take a form of a computer program product on a computer-readable storage medium having computer-readable and executable codes within the storage medium.

What is claimed is:

1. A Signaling System No. 7 (SS7) node for routing transaction capabilities application part (TCAP) messages from a first subnet to a second subnet by discovering a destination node from a plurality of nodes in the second subnet, comprising:
   a) a first interface for the first subnet;
   b) a second interface for the second subnet;
   c) a processor in communication with the first and second interfaces and one or more structured database storages, the processor configured to:
   i) receive a first TCAP message from the first subnet through the first interface;
   ii) extract originating point code (OPC), destination point code (DPC) and transaction identifier (TID) of said first TCAP message;
   iii) broadcast a message to all or a part of said plurality of the nodes in the second subnet through the second interface;
   iv) receive one or more responses to the message from one or more of said plurality of the nodes in the second subnet;
   v) determine the destination node and a corresponding OPC, DPC and TID based on a most successful one of the one or more responses;
   vi) route the most successful one of one or more responses to the first subnet through the first interface;
   vii) receive a second TCAP message from the first subnet through the first interface subsequent to determining the destination node and a corresponding OPC, DPC and TID based on said most successful one of the one or more responses;

viii) extract originating point code (OPC), destination point code (DPC) and transaction identifier (TID) of said second TCAP message ix) look up and retrieve, from said one or more structured database storages, said corresponding OPC, said corresponding DPC and said corresponding TID for said destination node in said second subnet partially or combinedly based on said extracted OPC, DPC and TID of said second received TCAP message;

x) replace said extracted OPC, DPC and TID of said second TCAP message with said retrieved corresponding OPC, DPC and TID; and xi) forward said second TCAP message with said corresponding OPC, DPC, and TID through said second interface to the second subnet.

2. The SS7 node as recited in claim 1, wherein said broadcast message is a TCAP Begin message.

3. The SS7 node as recited in claim 2, wherein said first TCAP message is a TCAP Begin message.

4. The SS7 node as recited in claim 1, wherein said look up and retrieval of said corresponding OPC, said corresponding DPC and said corresponding TID is based on said DPC of said received second TCAP message.

5. The SS7 node as recited in claim 1, wherein said first subnet is a public SS7 network and said second subnet is a private SS7 network.

6. The SS7 node as recited in claim 1, wherein said most successful response from said plurality of nodes in said second subnet is a first successful response.

7. A method of routing transaction capabilities application part (TCAP) messages from a first subnet to a second subnet by discovering a destination node from a plurality of nodes in the second subnet, comprising the steps of:
 a) at a node, receiving a first TCAP message from the first subnet;
 b) at the node, extracting an originating point code (OPC), a destination point code (DPC) and a transaction identifier (TID) of said first TCAP message;
 c) from the node, broadcasting a message to all or a part of said plurality of nodes in the second subnet;
 d) at the node, receiving one or more responses to the message from one or more of said plurality of the nodes in the second subnet;
 e) determining the destination node and a corresponding OPC, DPC and TID based on a most successful one of the one or more responses;
 f) routing the most successful one of one or more responses to the first subnet;
 g) at the node, receiving a second TCAP message from the first subnet subsequent to determining the destination node and a corresponding OPC, DPC, and TID based on said most successful one of the one or more responses;
 h) at the node, extracting an originating point code (OPC), a destination point code (DPC) and a transaction identifier (TID) of said second TCAP message;
 i) look up and retrieve, from one or more structured database stores, said corresponding OPC, said corresponding DPC and said corresponding TID for said extracted OPC, DPC and TID for said destination node in said second subnet partially or combinedly based on said extracted OPC, DPC and TID of said second received TCAP message;
 j) replace said extracted OPC, DPC and TID of said second TCAP message with said retrieved corresponding OPC, DPC and TID; and
 k) forward said second TCAP message with said corresponding OPC, DPC, and TID to the second subnet.

8. The method as recited in claim 7, wherein said broadcast message is a TCAP Begin message.

9. The method as recited in claim 8, wherein said first TCAP message is a TCAP Begin message.

10. The method as recited in claim 7, wherein said look up and retrieval of said corresponding OPC, said corresponding DPC and said corresponding TID is based on said DPC of said received second TCAP message.

11. The method as recited in claim 7, wherein said first subnet is a public SS7 network and said second subnet is a private SS7 network.

12. The method as recited in claim 7, wherein said most successful response from said plurality of nodes in said second subnet is a first successful response.

13. A non-transitory computer readable storage medium storing executable computer program instructions which, when executed at a node, causes the node to perform a process of routing transaction capabilities application part (TCAP) messages from a first subnet to a second subnet by discovering a destination node from a plurality of nodes in the second subnet, comprising the steps of:
 a) at the node, receiving a first TCAP message from the first subnet;
 b) at the node, extracting an originating point code (OPC), a destination point code (DPC) and a transaction identifier (TID) of said first TCAP message;
 c) from the node, broadcasting a message to all or a part of said plurality of nodes in the second subnet;
 d) at the node, receiving one or more responses to the message from one or more of said plurality of the nodes in the second subnet; e) determining the destination node and a corresponding OPC, DPC and TID based on a most successful one of the one or more responses;
 f) routing the most successful one of one or more responses to the first subnet;
 g) at the node, receiving a second TCAP message from the first subnet subsequent to determining the destination node and a corresponding OPC, DPC, and TID based on said most successful one of the one or more responses;
 h) at the node, extracting an originating point code (OPC), a destination point code (DPC) and a transaction identifier (TID) of said second TCAP message;
 i) look up and retrieve, from one or more structured database stores, said corresponding OPC, said corresponding DPC and said corresponding TID for said extracted OPC, DPC and TID for said destination node in said second subnet partially or combinedly based on said extracted OPC, DPC and TID of said second received TCAP message;
 j) replace said extracted OPC, DPC and TID of said second TCAP message with said retrieved corresponding OPC, DPC and TID; and
 k) forward said second TCAP message with said corresponding OPC, DPC, and TID to the second subnet.

14. The computer readable storage medium as recited in claim 13, wherein said broadcast message is a TCAP Begin message.

15. The computer readable storage medium as recited in claim 14, wherein said first TCAP message is a TCAP Begin message.

16. The computer readable storage medium as recited in claim 13, wherein said look up and retrieval of said corresponding OPC, said corresponding DPC and said corresponding TID is based on said DPC of said received second TCAP message.

17. The computer readable storage medium as recited in claim 13, wherein said first subnet is a public SS7 network and said second subnet is a private SS7 network.

18. The computer readable storage medium as recited in claim 13, wherein said most successful response from said plurality of nodes in said second subnet is a first successful response.

* * * * *